(12) United States Patent
de la Peña et al.

(10) Patent No.: US 6,674,827 B2
(45) Date of Patent: Jan. 6, 2004

(54) SEGMENTED LATTICE RACK TO STORE FUELS COMING FROM NUCLEAR REACTORS

(75) Inventors: Luis Costa de la Peña, Maliaño-Cantabria (ES); Javier Tovar Albillos, Maliaño-Cantabria (ES)

(73) Assignee: Equipos Nucleares S.A., Cantabria (ES)

( * ) Notice: Subject to any disclaimer, the term of this patent is extended or adjusted under 35 U.S.C. 154(b) by 0 days.

(21) Appl. No.: 10/157,419

(22) Filed: May 29, 2002

(65) Prior Publication Data

US 2003/0223529 A1 Dec. 4, 2003

(51) Int. Cl.$^7$ .............................. G21C 19/06; G21F 5/00
(52) U.S. Cl. ..................................... 376/272; 250/507.1
(58) Field of Search ..................... 376/272; 250/506.1, 250/507.1

(56) References Cited

U.S. PATENT DOCUMENTS

| | | | | |
|---|---|---|---|---|
| 4,930,650 A | * | 6/1990 | Wells | 376/272 |
| 5,032,348 A | | 7/1991 | Blum et al. | 376/272 |
| 5,063,299 A | * | 11/1991 | Efferding | 376/272 |
| 5,881,120 A | * | 3/1999 | Chanzy et al. | 376/272 |

FOREIGN PATENT DOCUMENTS

| | | |
|---|---|---|
| DE | 2930237 | 2/1981 |
| EP | 0759623 A1 | 2/1997 |
| EP | 0769785 A1 | 4/1997 |
| EP | 0769785 B1 | 3/1999 |
| FR | 2433226 | 3/1980 |
| JP | 0694 892 * | 4/1994 ................. 376/272 |

* cited by examiner

Primary Examiner—Harvey E. Behrend
(74) Attorney, Agent, or Firm—Brown & Michaels, PC

(57) ABSTRACT

A segmented lattice rack to store fuels coming from nuclear reactors, whose walls are made of plates joined orthogonally forming a mesh defining multiple cell cavities which are longitudinally coupled forming a sandwich comprising a central part coinciding with the active part of the stored element, being from a material obtained from neutronic poisons, preferably boron treated steel; whilst the end areas coinciding with the non-active part of the stored radioactive element are of normal stainless steel, joined to each other and with the adjacent components by means of welding or pretensioning.

7 Claims, 4 Drawing Sheets

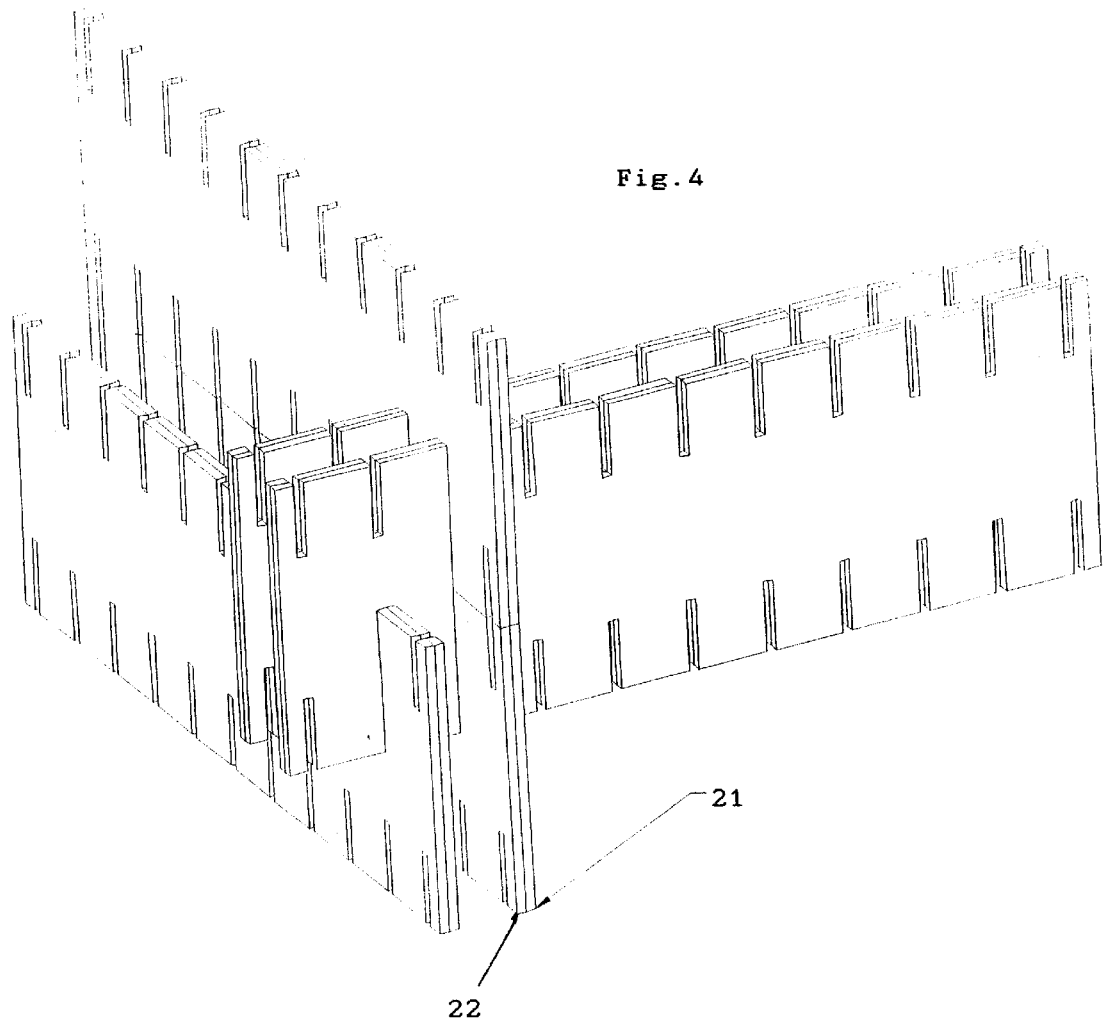

SEGMENTED LATTICE RACK TO STORE FUELS COMING FROM NUCLEAR REACTORS

BACKGROUND OF THE INVENTION

1. Field of the Invention

The invention, as indicated in the title, refers to the construction of segmented lattice racks usable in nuclear power stations for the storage of fuel, both fresh and irradiated, in a swimming-pool full of water or boron treated water which acts as a cooling and radiological shielding medium. The rack has neutronic poisons to prevent criticity. The fuel components are prismatic elements with a height much greater than the other dimensions.

2. Description of Related Art

In countries with nuclear programs in development and nuclear power stations under construction, in the area of irradiated fuel there was a need to densify the racks of the storage pools, which nuclear power stations have for such a purpose, by using stainless steel racks, equal to those available in the past but bringing the fuels closer together, permitting storage capacity to be increased. At that time, at the end of the seventies and beginning of the eighties, the racks had stainless steel channels without any additional material acting as a neutronic poison since the distance or passage between the cells was great enough so that the water, whether treated with boron or not, existing between cells ("water gap") was sufficient to maintain the criticity at acceptable levels. They had a lower mesh for the support of the fuel components and were anchored both to the bottom and sides of the pool to form a single interlocked assembly, with effective performance even during earthquakes.

As a result of this approach of the stored fuel components and to increase the capacity of the pools, it was necessary to use an additional material to prevent criticity. The materials used more frequently as neutron poisons are, apart from water itself, whether treated with boron or not, boron treated steel and Boral (a dispersion of a boron carbide in aluminium).

Currently, two types of rack construction exist: one consisting of constructing the vertical channels of the entire height of the fuel component from welded pipes and plates forming pipes and joining the channels to form the rack, and another one consisting of forming the rack by means of different levels of interlaced or not-interlaced lattices until completing the necessary height. Racks of this type are formed throughout their height (longitudinally) by several piled lattices.

German Patent DE-2930237 foresees a device of these features in which each one of the lattices consists of plate strips which cross, being superimposed and packed as a whole by some enveloping steel bands forming a complex structure. The coupling of the different plates forming the lattices between each other is performed across grooves on both faces thereof, being orthogonally joined through this area in a known dovetailed solution.

European Patent Applications EP-0759623 and EP-0769785, of CCI AG, refer to an assembly for nuclear fuel storage and to a storage rack for said fuel in which there are also several lattice units whose plates in one direction are at the same level as the perpendicular ones, but in their upper and lower parts have some outgoing and incoming shapes, related to each other (one lattice opposite the other) which are coupled in the pile, preventing lateral sliding in any direction.

U.S. Pat. No. 5,032,348 is designed for dry storage and transportation of dry fuel, not in swimming pools as in the present invention, and basically provides a sandwich of structural steel cylinders with an inner framework. The structural function is performed by the outer steel cylinders and not by the framework.

French Patent FR 2,433,226 refers to a framework designed for storing nuclear fuel, forming a double wall interlocked matrix.

The rack proposed in the present invention shares, like all those of this type existing until now, the idea of forming lattices which are piled forming a sandwich in which a plurality of bottle holder type vertical cavities have been defined and in which each one of the irradiated fuel components coming from the power stations is stored. Similar to the documents initially mentioned, these lattices are formed by means of lines of plates grooved on both faces, over which are coupled, at a different level, another line of plates perpendicular to the former, all of them dovetailed to each other across the opposite grooves arranged for such a purpose.

SUMMARY OF THE INVENTION

Different to previous documents, in the rack of the this lattice structure, the plates forming this lattice structure, coinciding with the active part of the radioactive component, consists of a material formed from neutronic poisons, preferably boron treated steel, consisting of a single plate or in a sandwich consisting of two boron treated steel plates with an intermediate gap to permit the passage of water, whether boron treated or not, from the pool. Also a sandwich formed by two stainless steel plates separated by Boral dispersion of a boron carbide in aluminium may be used. The plates forming the end zones, coinciding with the non-active part of the stored radioactive component are of normal stainless steel. These last plates are securely welded to each other. With this height difference of materials, a saving thereof is permitted since only special materials are employed, expensive ones, in the required areas. Besides, the manufacture is with few or no welds in the central body and hence with a significant reduction of assembly inspection and manufacturing costs.

To the rack constructed in this way, another with similar characteristics may be coupled above, having equal or less height, to pile the fuel components at two levels.

The plates constituting each one of the intermediate lattices, with that situated in the same upper and/or lower plane, besides being situated at 90° rotation to fit into each other, preventing lateral movement in any direction, may be joined by means of angle or "T" welding, to form a rigid assembly if the mechanical design conditions so require. But in most cases in which the mechanical design conditions do not so demand, or in those countries where the legislation impedes welding to be performed in this area or where the materials integrating these plates are not weldable, a vertical tying of the different lattices is performed by means of pretensioned thin strips welded on the lower and upper stainless steel lattices which are packed together once the structure is assembled and hence preventing intermediate welds.

These and other features of the present invention will be more easily understood with the aid of the following description based on a preferred embodiment. This description is carried out on the grounds of the attached drawings, in which:

BRIEF DESCRIPTION OF THE DRAWING

FIG. 4 is a perspective view of a plate formed by two plates of stainless steel and boron treated stainless steel.

DETAILED DESCRIPTION OF THE INVENTION

Figure 1:
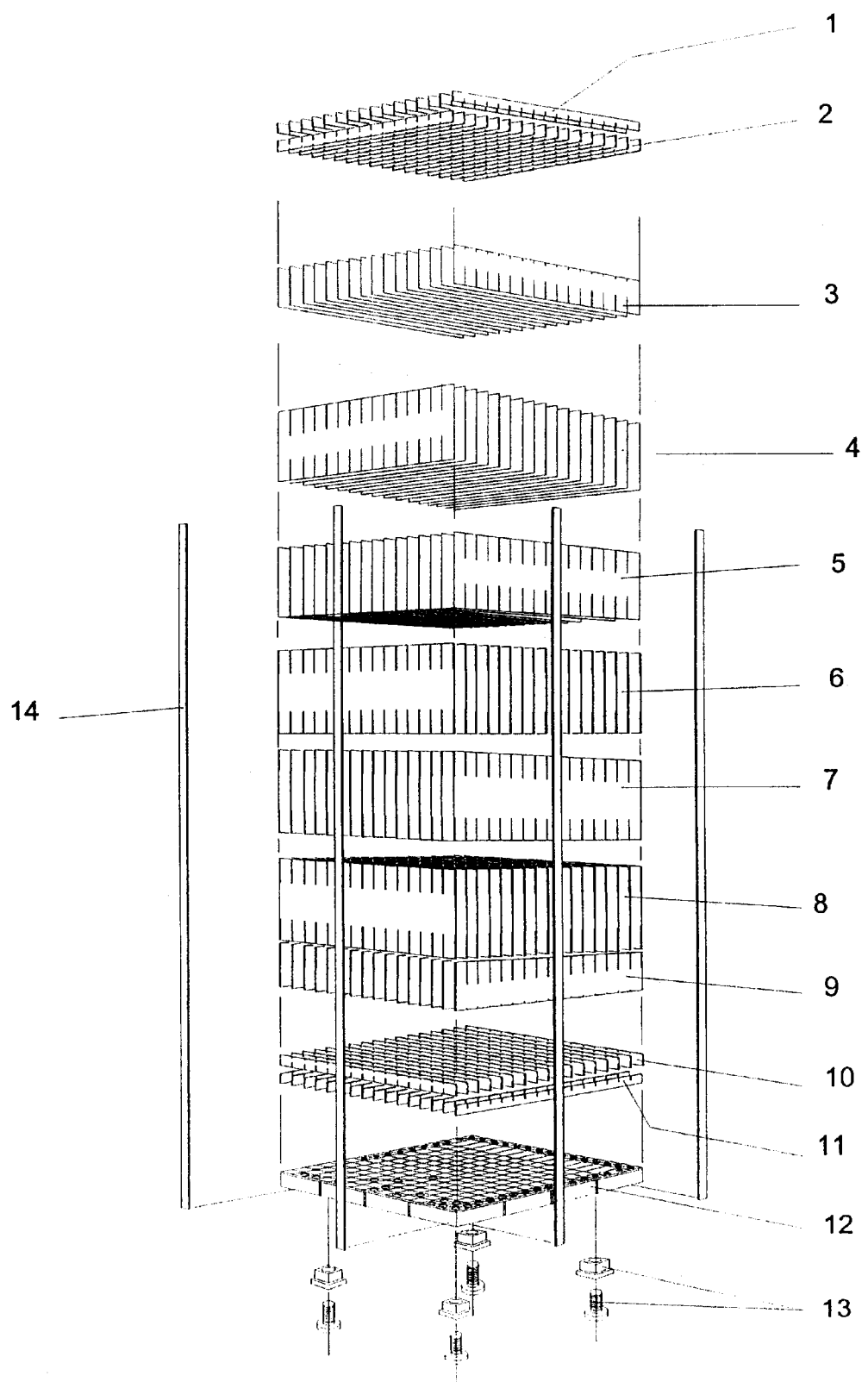
FIG. 1 shows a general perspective view with the items comprising a rack for fresh and irradiated fuel components in nuclear power stations.

Firstly referring to FIG. 1, a segmented rack is observed which integrates several intermediate lattices (3) to (9), coinciding with the active part of the stored radioactive component and another two assemblies (1)(2) and (10)(11) coinciding with the non-active part of said stored component, all supported by a base (12) provided with adjustable support legs (13).

Figure 2:
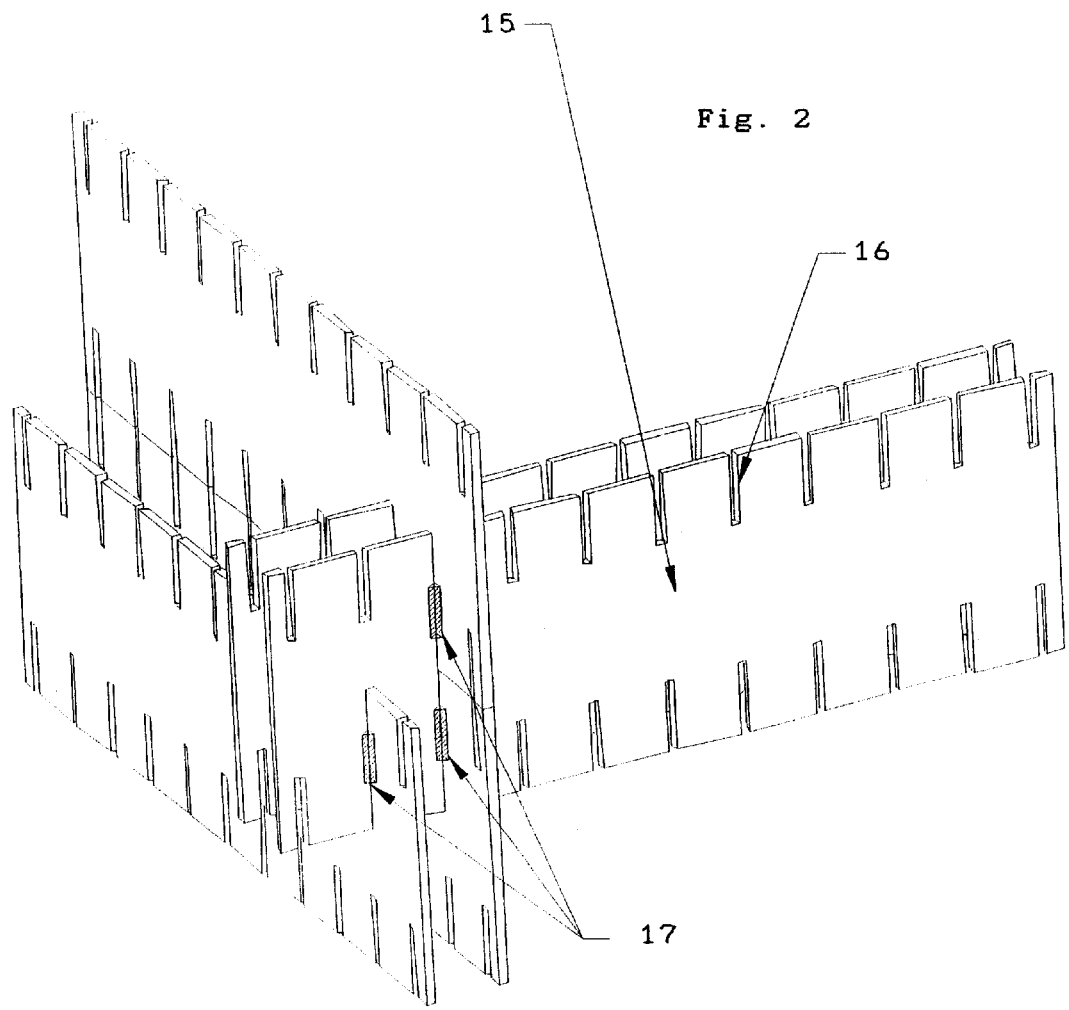
FIG. 2 shows a schematic view of an interlaced joint at a different level between plates shaping each lattice.
Figure 3:
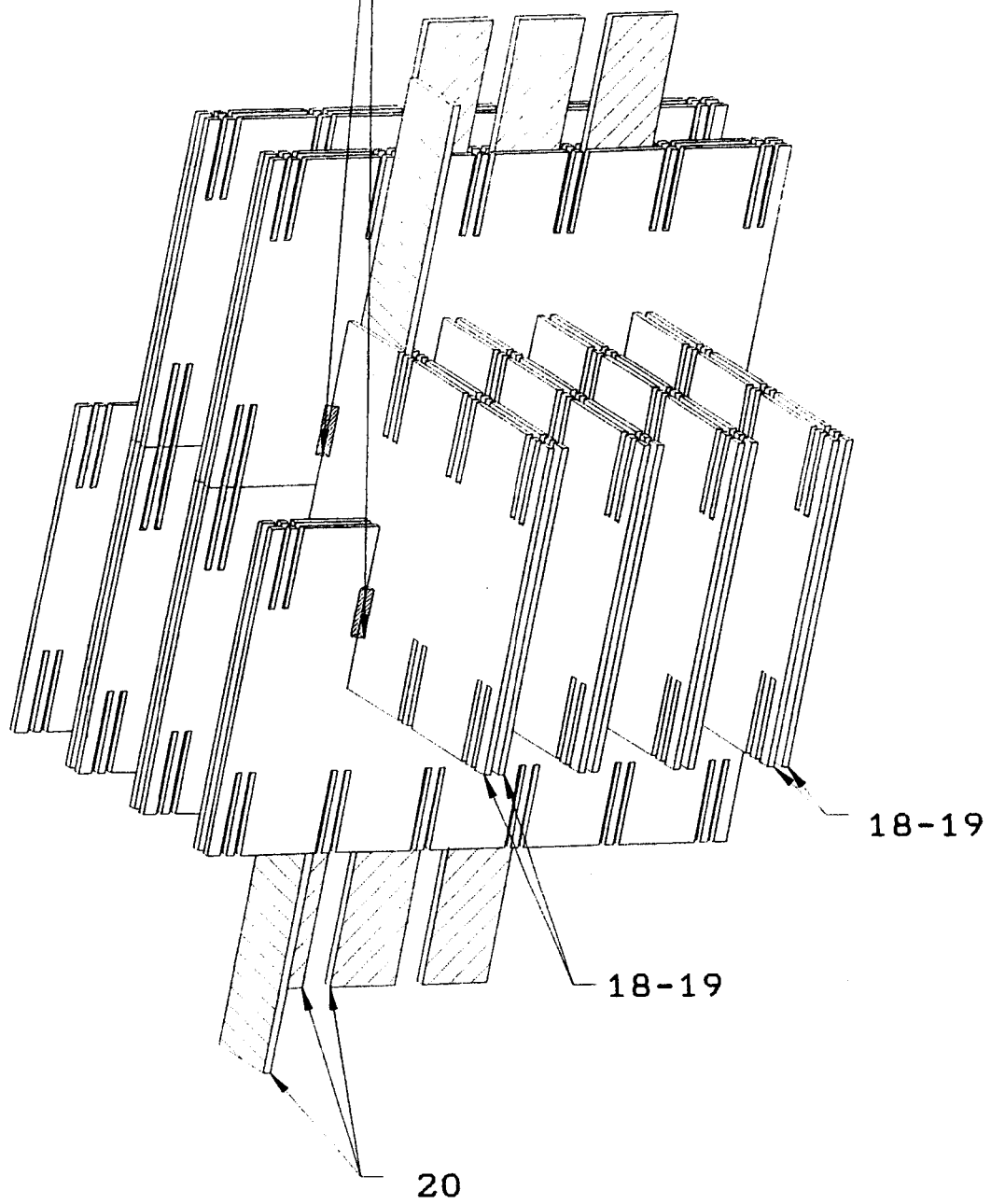
FIG. 3 is a perspective view of a plate consisting of two steel plates with an internal core of Boral dispersion of a boron carbide in aluminium.

According to the present invention, the intermediate components (3) to (9) which coincide with the active part of the stored radioactive component, consist of plates of a material formed from neutronic poisons, the most common being:

a) A single plate of boron treated steel as shown in FIG. 2.

b) Two plates of normal steel (18–19) forming a double wall, inside of which there is boron treated water or Boral laminates (20). Boral is a dispersion of boron carbide in an aluminium matrix. See FIG. 3.

c) Two adjacent plates, one of normal stainless steel (21) and the other of boron treated steel (22) as shown in FIG. 4. However, the assemblies (1)(2) and (10)(11) are carried out with normal stainless steel plates, not treated with boron and with a low carbon content, having a greater thickness than material integrating the central lattices.

The coupling between one of these intermediate lattices (4) with that located immediately above (3) and/or below (5) is carried out by dovetailing across the grooves (16) on both sides of the plates (15) which integrate each mesh as shown in FIG. 2. The joint is finally carried out by angle welding (17), if this is necessary for the design conditions, forming very stable, rigid assemblies; and in those applications where due to the mechanical design conditions, it is not necessary to weld, or the internal material comprising each one of these lattices were not welded or were not weldable, or in countries where welding is not authorized, a vertical tying of the different meshes is performed by thin, pretensioned strips (14), welded to the lower and upper stainless steel meshes.

All the intermediate components (4) to (9) are formed by plates (15) grooved on both sides, forming at least one line in one direction and another perpendicular to the former at a different level, being joined across said grooves (16) to form a reticulated volume in which extended and parallel conduits are formed by piling successive lattices.

The end units of the rack, shown in the figure with references (3) and (9), are formed by parallel plates with a width equivalent to the difference in height between the two plates conforming the central units, in such a way that arranged in the suitable plane, they overlap the protruding part of the former to form an extremely flat lattice unit, or in other words, terminating the corresponding part which in any of the previous configurations was drawn in with respect to the most protruding plates.

The materials, shape and arrangement of the components may vary provided this does not involve a change of the essential features of the invention claimed below:

What is claimed is:

1. A segmented lattice rack for storing fuel components from nuclear power stations, having walls made of plates, the plates being orthogonally joined, forming a lattice defining numerous cell cavities, longitudinally coupled forming a sandwich, comprising:

a) a central part of a material formed from neutronic poisons, coinciding with an active part of the stored fuel component, comprising:

a plurality of intermediate units (4)–(8) which in one direction have successive parallel plates grooved on both sides, over which other grooved orthogonal plates are orthogonally installed and in both directions, which coincide with the center of the former and protrude above and below; where said lattices are coupled at a relative displacement of 90°, such that on one plane there is a discontinuity in height in one or other direction, but when piled, rotated with respect to each other, they couple forming conduits; and two end units (3) and (9), formed by parallel plates with a width equivalent to the difference between the two plates of the central units, arranged in a plane, so that they overlap the protruding part of the former, to finish the assembly on a same plane, closing the conduits;

b) two end zones coinciding with a non-active part of the stored radioactive component, formed by two sets of lattices (1)(2) and (10)(11), the latter welded to a cover or end plate, providing rigidity to the rack.

2. The rack of claim 1, in which the plates are joined to each other by angle welding (17) forming a rigid assembly.

3. The rack of claim 1, in which the lattices is tied together by means of thin, pretensioned strips (14) welded to the lower and upper lattices.

4. The rack of claim 1, in which the plates of the central part are of stainless steel, and are fitted forming a double wall (18)(19) having a gap filled with a material (20) chosen from the group comprising boron treated water and Boral dispersion of boron carbide in aluminium.

5. The rack according to claim 1, in which the plates of the central part comprise an assembly formed by a stainless steel plate (21) and a boron treated steel plate (22).

6. The rack of claim 1, in which the plates of the central part are of boron treated steel.

7. The rack of claim 1, further comprising a lower part serving as a support to the bottom of the pool, in which plates of this area are of normal stainless steel, joined to each other and to adjacent components by means of welding.

* * * * *